United States Patent

[11] 3,613,704

| [72] | Inventor | Eustace Laurence Goldsmith<br>Harrold, England |
|---|---|---|
| [21] | Appl. No. | 36,255 |
| [22] | Filed | May 11, 1970 |
| [45] | Patented | Oct. 19, 1971 |
| [73] | Assignee | Minister of Technology in Her Britannic Majesty's Government of the United States of Great Britain and Northern Ireland<br>London, England |
| [32] | Priority | May 9, 1969 |
| [33] | | Great Britain |
| [31] | | 23735/69 |
| | | Continuation-in-part of application Ser. No. 705,370, Feb. 14, 1968, now Patent No. 3,524,458, dated Aug. 18, 1970. |

[54] AIRCRAFT ENGINE INTAKE STRUCTURES
14 Claims, 3 Drawing Figs.

[52] U.S. Cl. .................................................. 137/15.2
[51] Int. Cl. ..................................................... F02b 27/00, F02c 7/04
[50] Field of Search ........................................ 137/15.1, 15.2

[56] References Cited
UNITED STATES PATENTS
2,995,892   8/1961   Kosson ........................ 137/15.2
3,430,640   3/1967   Lennard ....................... 137/15.1

Primary Examine, —Alan Cohan
Attorney—Cameron, Kerkam & Sutton

ABSTRACT: Application Ser. No. 705,370 filed on Feb. 14, 1968—now U.S. Pat. No. 3,524,458 issued Aug. 18, 1970—describes an invention relating to fluid flow intake ducts particularly for aircraft engines for aircraft required to operate throughout a speed range embracing both subsonic and supersonic speeds. According to the earlier invention an intake duct has a bluff forward facing wall or step movable transversely across the duct to deflect the boundary layer from an aerodynamic surface forward of said wall, said surface comprising for example part of the intake or the surface of a centerbody extending forward from the duct, and having a bleed aperture extending through the wall of the duct downstream of said movable wall through which some at least of the deflected boundary layer which passes over said movable wall flows away from the free mass of fluid flowing through the duct downstream of said wall. According to the present invention in a fluid flow intake duct of the type having, forward of the duct, structure over which air flows towards the duct at least when the duct mounting is in forward motion, a movable wall has its upstream face positioned upstream of the inlet plane of the duct by a distance not greater than the maximum transverse distance between the structure and a corresponding leading edge of the duct. Preferably the distance between the upstream face and the inlet plane is 0.25 said maximum transverse distance.

3,613,704

PATENTED OCT 19 1971

AIRCRAFT ENGINE INTAKE STRUCTURES

This application is a continuation-in-part of the invention described in application Ser. No. 705,370 which was filed on Feb. 14, 1968 now U.S. Pat. No. 3,524,458 issued Aug. 18, 1970—and relates to fluid flow intake ducts.

The invention is particularly related to fluid flow intake ducts for aircraft engines for aircraft required to operate throughout a range embracing both subsonic and supersonic airspeeds; it is related to aircraft intake ducts of the type in which the boundary layer from an associated aerodynamic surface comprises part of the fluid flow into the duct.

Thus the invention relates to ducts having a central streamlined wedgelike centerbody extending forwardly beyond the duct-leading edge from within the duct from which body the boundary layer flows into the duct; the invention also relates to so-called side intake ducts of the type formed adjacent an aircraft fuselage, wing or tailplane and wherein part of the inner wall of the duct is defined by a continuation of the fuselage or the like within the duct and which fuselage or the like forms an aerodynamic surface forward of the intake, the boundary layer from which flows into the duct.

As stated in application, Ser. No. 705,370 it is known that the configuration of an aircraft engine intake duct, for efficient operation at subsonic aircraft airspeeds, will differ from the configuration best suited for efficient operation at supersonic aircraft airspeed. In particular, if the dimension of the intake generally transversely of the direction of airflow is made sufficiently large whereby an intake required to operate at supersonic aircraft speeds will pass enough air at subsonic speeds, then this dimension will be too large at supersonic aircraft speeds; that is, at supersonic airspeeds, instead of operating with low flow spillage and low drag the intake will exhibit high spillage and high drag characteristics and unstable flow conditions may occur in the intake and downstream.

With a view to overcoming these difficulties it has previously been proposed to provide an aircraft engine intake of variable inlet area, the area being decreased for operation at supersonic speeds. Thus, in the case of an intake having a generally central wedge compression surface it has been proposed that provision be made to vary the effective area of the intake by causing the angle of the wedge compression surface to vary with changes in airspeed.

The present invention has for an object to provide an improved aircraft engine intake structure.

The invention is a modification of the invention claimed in Pat. application, Ser. No. 705,370.

According to the present invention, an aircraft engine intake structure, over which air flows towards an engine intake duct at least when the aircraft is in forward motion, includes, a movable wall or step having its leading edge upstream of the inlet plane of the duct by a distance of not more than the transverse distance between the structure on which the movable wall is mounted and a corresponding leading edge of the duct, and movable between a retracted position for use at subsonic airspeeds of the aircraft and an extended position for use at supersonic airspeeds of the aircraft to cause boundary layer flow over the structure to separate from the structure and bleed means, downstream of the movable wall, for bleeding away some at least of the separated boundary layer from the mass of air flowing into the duct.

Preferably, the leading edge of said movable wall will be located at a distance upstream of the inlet plane of the duct less than 0.25 of said transverse distance.

Two embodiments of the invention are illustrated by the accompanying diagrammatic drawings of which:

Figure 1:
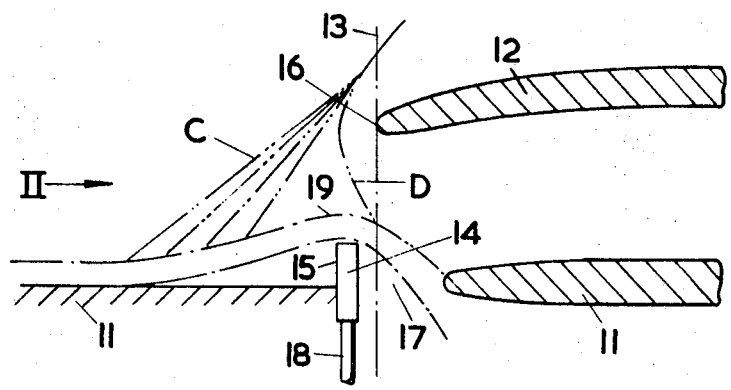
FIG. 1 is a sectional plan view.
Figure 2:
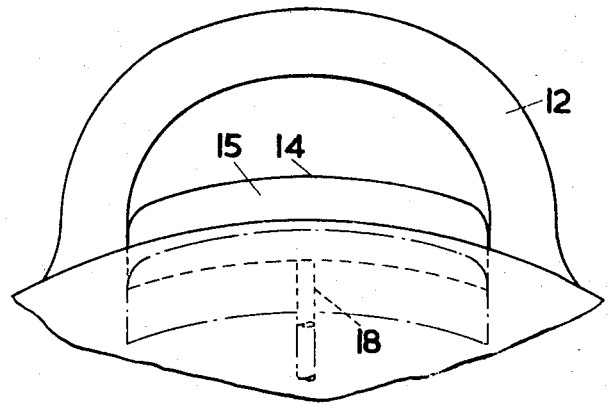
FIG. 2 is an end view in the direction of the arrow II of FIG. 1 of one embodiment.

FIGS. 1 and 2 show part of the side of an aircraft fuselage 11 which together with a generally C-shaped enclosure 12 defines an aircraft engine intake duct. The part 11 extends from forward of the inlet plane 13 of the duct and continues aft of said inlet plane where it defines part of the duct. A movable step or wall 14 is mounted in the fuselage forward of the inlet plane 13 such that its forward edge 15 is at a distance forward of said plane equivalent to 0.25 of the transverse dimension from the fuselage 11 to the opposite leading edge 16 of the enclosure 12. A bleed aperture 17 is provided downstream of the wall 14. An input control member 18 operable under manual control of the pilot or automatically in accordance with variations in airspeed, affords an input drive to move the wall 14.

In operation, at subsonic airspeeds, the wall 14 is retracted as shown by the dotted lines at FIG. 2 to provide a maximum intake area for the duct. At supersonic speeds the wall is moved to protrude into the airstream as shown in full lines. The degree of protrusion, which will vary in accordance with variations of supersonic airspeeds, will ideally be sufficient to cause boundary layer separation from the fuselage as shown by the dotted lines 17 (FIG. 11) which represent the boundary layer. This separation of the boundary layer produced an aerodynamic wedge which forms a desirable shock wave system, the shock waves being shown at C and D. After passing over the wall 14, the boundary layer is, to some extent at least, drawn out of the duct through the bleed aperture 17 as shown, leaving smooth airflow conditions in the duct downstream of the wall 14.

Figure 3:
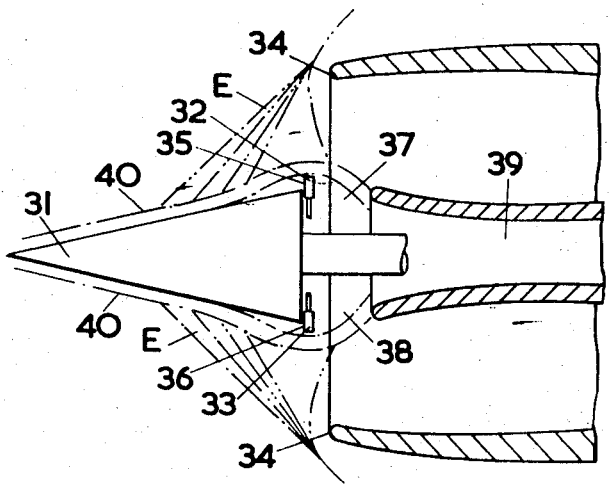
FIG. 3 is a sectional side elevation of a second embodiment.

FIG. 3 shows an aircraft engine intake duct, which may be of rectangular cross section, of the type having a central streamlined wedgelike body 31 of similar cross section. Movable walls or steps 32, 33 are provided at the upper and lower surfaces (as shown in FIG. 3) of the wedge 31, respectively. The leading edge of the intake duct is shown at 34 and the movable walls are located with their leading edges 35, 36 at a distance forward of the plane containing said leading edges equivalent to 0.25 of the transverse dimension from the wedge surface to the corresponding opposite leading edge. Bleed apertures 37, 38 are provided immediately downstream of the movable walls, 32, 33 respectively and feed into an inner duct 39.

In operation a boundary layer 40, which is attached to the surface of the wedge 31 at subsonic airspeeds, when the walls 32 and 33 are retracted, is forced to separate from it at supersonic airspeeds when the walls 32, 33 are extended so that after passing over the walls 32, 33 it flows out, at least partially through the bleed apertures 37, 38 and into the inner duct 39. As a result a desirable shock wave system as shown at E is created.

Whilst the embodiment according to FIG. 3 refers to an aircraft engine intake duct of rectangular cross section, the invention is equally applicable to a duct of circular cross section wherein the wedge is of conical form and in which case the movable walls 32, 33 will be replaced by an annular movable wall as in the case of the arrangement of FIGS. 4 and 5 of my copending application, Ser. No. 705,370.

Also, and as disclosed with reference to FIG. 3 of my copending application, Ser. No. 705,370, additional features may be included to improve the aerodynamic efficiency. These comprise small-blowing jets positioned forward of the movable walls to increase the velocity of the boundary layer, at least one subsidiary bleed aperture upstream and adjacent the movable walls through the application of suction through which reduces the thickness of the boundary layer, blowing jets at the rear of the movable wall directed towards the downstream bleed aperture and operative by ejection action to entrain the separated boundary layer to encourage its flow through the bleed aperture, and a pivoted structure defining the downstream edge of the bleed aperture, and movable to a position in which it acts as a scoop to deflect some at least of the deflected boundary layer through the bleed aperture.

Although the leading or forward edges of each of the movable walls 14 and 32,33 are hereinbefore described as laying at a distance forward of the inlet plane of the duct which is 0.25 of the distance between the structure on which they are mounted and the corresponding leading edge of the duct, they may lie at any distance forward of the inlet plane not more

I claim:

1. A fluid flow intake duct of the side intake type in which the duct is defined by a wall adjacent part of an aircraft structure, such as a fuselage, wing or tailplane, and said part of said structure, which structure forwards of the duct so defined forms an aerodynamic surface the boundary layer from which flows into the duct, and having a bluff forward facing wall or step, mounted on the structure with its leading edge upstream of the inlet plane of the duct by a distance of not more than the maximum transverse distance between the structure and a corresponding leading edge of the duct, and movable transversely of the direction of fluid flow into the duct from a retracted position to an extended position, and means defining a bleed aperture through the wall of the duct downstream of said movable wall, said movable wall being held in the retracted position at subsonic airspeeds and being extended at supersonic airspeeds at which extended position the boundary layer flow, which at subsonic airspeeds is attached to the surface upstream of said movable wall, is caused to separate from said upstream surface and to flow over said movable wall whereafter part at least of said separated boundary layer flows out through said bleed aperture.

2. A fluid flow intake duct as claimed in claim 1 wherein the leading edge of said movable wall is upstream of said inlet plane by a distance equal to 0.25 the maximum transverse distance between said structure and said corresponding leading edge of the duct.

3. A fluid flow intake duct as claimed in claim 1 having blowing means associated with the boundary layer forward of said movable wall and means for supplying air under pressure through said blowing means to increase the velocity of the boundary layer and to steepen the angle of separation.

4. A fluid flow intake duct as claimed in claim 1 having an outlet passage in the structure upstream of said movable wall to which structure the boundary layer is attached at subsonic airspeeds, and means for applying suction through said passage at supersonic airspeeds to reduce the thickness of the boundary layer.

5. A fluid flow intake duct as claimed in claim 1 having power means for supplying air under pressure and jets for directing air under pressure from said power means through said bleed aperture at supersonic airspeeds whereby part at least of the boundary layer flowing over said movable wall is entrained by ejector action to pass through said bleed aperture.

6. A fluid flow intake duct as claimed in claim 1 in which the downstream region of the means defining said bleed aperture comprises a movable section having pivotal support means at its downstream region and power means are provided for pivotally moving said section at supersonic speeds so that its upstream region protrudes into the intake, said section acting to induce some at least of the boundary layer to pass through said bleed aperture.

7. A fluid flow intake duct as claimed in claim 1 having blowing means associated with the boundary layer forward of said movable means and means for supplying air under pressure through said blowing means to increase the velocity of the boundary layer and to steepen the angle of separation, an outlet passage in the wall of the duct upstream of said movable means, to which wall the boundary layer is attached at subsonic airspeeds, and means for applying suction through said passage at supersonic airspeeds to reduce the thickness of the boundary layer, power means for supplying air under pressure and jets for directing air under pressure from said power means through said bleed aperture at supersonic airspeeds whereby part at least of the boundary layer flowing over said movable means is entrained by ejector action to pass through said bleed aperture, and in which the downstream region of the means defining said bleed aperture comprises a movable section, having pivotal support means at its downstream region and power means are provided for pivotally moving said section at supersonic speeds so that is upstream region protrudes into the intake, said section acting to induct some at least of the boundary layer to pass through said bleed aperture.

8. A fluid flow intake duct of the type having a central streamlined wedgelike centerbody extending forwardly from within the duct beyond the duct leading edge in which the duct is defined between the surface of the centerbody and a surrounding wall, said forwardly extending portion of the centerbody forming an aerodynamic surface the boundary layer from which flows into the duct and having a bluff forward-facing wall or step, mounted on the centerbody with its leading edge upstream of the inlet plane of the duct by a distance of not more than the maximum transverse distance between the centerbody surface and a corresponding leading edge of the duct, movable transversely of the direction of fluid flow into the duct from a retracted position to an extended position, and means defining a blade aperture through the surface of the centerbody downstream of said movable wall, said movable wall being held in the retracted position at subsonic airspeeds and being extended at supersonic airspeeds at which extended position the boundary layer flow, which at subsonic airspeed is attached to the surface of the centerbody upstream of said movable wall, is caused to separate from said upstream surface and to flow over said movable wall whereafter part at least of said separated boundary layer flow flows out through said bleed aperture.

9. A fluid flow intake duct as claimed in claim 8 wherein the leading edge of said movable wall is upstream of said inlet plane by a distance equal to 0.25 the maximum transverse distance between said structure and said corresponding leading edge of the duct.

10. A fluid flow intake duct as claimed in claim 8 having blowing means associated with the boundary layer forward of said movable wall and means for supplying air under pressure through said blowing means to increase the velocity of the boundary layer and to steepen the angle of separation.

11. A fluid flow intake duct as claimed in claim 8 having an outlet passage in the structure of the centerbody upstream of said movable wall, to which structure the boundary layer is attached at subsonic airspeeds, and means for applying suction through said passage at supersonic airspeeds to reduce the thickness of the boundary layer.

12. A fluid flow intake duct as claimed in claim 8 having power means for supplying air under pressure and jets for directing air under pressure from said power means through said bleed aperture at supersonic airspeeds whereby part at least of the boundary layer flowing over said movable wall is entrained by ejector action to pass through said bleed aperture.

13. A fluid flow intake duct as claimed in claim 8 in which the downstream region of the means defining said bleed aperture comprises a movable section, having pivotal support means at its downstream region and power means are provided for pivotally moving said section at supersonic speeds so that its upstream region protrudes into the intake, said section acting to induce some at least of the boundary layer to pass through said bleed aperture.

14. A fluid flow intake duct as claimed in claim 8 having blowing means associated with the boundary layer forward of said movable wall and means for supplying air under pressure through said blowing means to increase the velocity of the boundary layer and to steepen the angle of separation, an outlet passage in the structure of the centerbody upstream of said movable wall, to which surface the boundary layer is attached at subsonic airspeeds, and means for applying suction through said passage at supersonic airspeeds, to reduce the thickness of the boundary layer, power means for supplying air under pressure and jets for directing air under pressure from said power means through said bleed aperture at supersonic airspeeds whereby part at least of the boundary layer flowing over said movable wall is entrained by ejector action to pass through said bleed aperture, and in which the downstream region of the means defining said bleed aperture comprises a movable section, having pivotal support means at its downstream region and power means are provided for pivotally moving said section at supersonic speeds so that its upstream region protrudes into the intake, said section acting to induce some at least of the boundary layer to pass through said bleed aperture.